United States Patent
Hagimoto et al.

(10) Patent No.: US 11,279,339 B2
(45) Date of Patent: Mar. 22, 2022

(54) CONTROL SYSTEM FOR HYBRID VEHICLE

(71) Applicant: TOYOTA JIDOSHA KABUSHIKI KAISHA, Toyota (JP)

(72) Inventors: Taiga Hagimoto, Mishima (JP); Tetsuhiro Maki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 16/592,324

(22) Filed: Oct. 3, 2019

(65) Prior Publication Data
US 2020/0156620 A1  May 21, 2020

(30) Foreign Application Priority Data
Nov. 20, 2018  (JP) .............................. JP2018-217644

(51) Int. Cl.
| | |
|---|---|
| *B60W 20/13* | (2016.01) |
| *B60W 10/26* | (2006.01) |
| *B60L 50/10* | (2019.01) |
| *B60L 50/61* | (2019.01) |

(52) U.S. Cl.
CPC ............. *B60W 20/13* (2016.01); *B60L 50/10* (2019.02); *B60L 50/61* (2019.02); *B60W 10/26* (2013.01); *B60W 2510/244* (2013.01)

(58) Field of Classification Search
CPC .................. B60W 20/13; B60W 10/26; B60W 2510/244; B60W 2530/209; B60W 10/06; B60W 10/08; B60W 20/00; B60L 50/10; B60L 50/61; B60L 2240/12; B60L 2250/26; B60L 2240/44; B60L 2240/547; B60L 58/14; B60K 6/46; Y02T 10/70; Y02T 10/62
See application file for complete search history.

(56) References Cited

U.S. PATENT DOCUMENTS

| | | | |
|---|---|---|---|
| 7,259,644 B2 * | 8/2007 | Sasaki ..................... H01P 3/081 |
| | | | 333/238 |
| 7,259,664 B1 * | 8/2007 | Cho ........................ B60L 50/61 |
| | | | 340/450.2 |
| 2001/0020833 A1 | 9/2001 | Yanase et al. | |
| 2018/0281773 A1 * | 10/2018 | Bell ....................... B60W 20/13 |
| 2018/0370522 A1 * | 12/2018 | Collins ............ B60W 30/18127 |
| 2019/0283624 A1 * | 9/2019 | Nakao ................... B60L 3/0046 |

FOREIGN PATENT DOCUMENTS

| | | | | |
|---|---|---|---|---|
| JP | 2001-238304 A | | 8/2001 | |
| JP | 2014125083 A | * | 7/2014 | ......... Y02T 10/6234 |

* cited by examiner

*Primary Examiner* — Stacy Whitmore

(74) *Attorney, Agent, or Firm* — Sughrue Mion, PLLC

(57) ABSTRACT

A hybrid vehicle includes a generator, a driving motor, and a battery. The control system includes the hybrid vehicle, and a controller for controlling the generator and the driving motor. The controller calculates a battery output request value and a power-generating output request value based on traveling conditions of the vehicle, and controls the driving motor and the power generator based on these values. At this time, when a state of the battery is a state in which the power-generating output request value is not satisfied, the controller executes an adjustment process for adjusting the battery output request value and the power-generating output request value. In the adjustment process, the smaller the remaining capacity of the battery, the smaller the battery output request value is and the larger the power-generating output request value is.

7 Claims, 5 Drawing Sheets

CONTROL SYSTEM FOR HYBRID VEHICLE

CROSS-REFERENCE TO RELATED APPLICATION

The present application is based on, and claims priority from, Japanese Patent Application Serial Number 2018-217644, filed on Nov. 20, 2018, the disclosure of which is hereby incorporated by reference herein in its entirety.

FIELD

The present disclosure relates to a control system of a hybrid vehicle, and more particularly, to a control system of a series type hybrid vehicle in which electric power is generated using an internal combustion engine for power-generating and the vehicle is driven by a driving motor.

BACKGROUND

Japanese Patent Application Laid-Open No. 2001-238304 discloses a technique related to a power-generating control apparatus of a hybrid electric vehicle. In this technique, normal output power generation is started by the generator when a charge level is equal to or lower than a predetermined power generation start value, and when a required power consumption of a traveling motor is equal to or higher than a set value, high output charge of higher output than a normal output charge is performed instead of the normal output charge. According to such control, high-output power generation is started at a phase before power of a battery starts to decrease. Thereby, rapid discharge of the battery is prevented and efficient charge and discharge control may be maintained.

SUMMARY

In a series hybrid vehicle, a generator is driven by an on-board engine, and a power-generating output of the generator is used to charge a battery. When an output of the hybrid vehicle is large, the power-generating output is used for driving the driving motor as well as a battery output discharged from the battery.

The battery for driving mounted on the hybrid vehicle has a characteristic that the higher the battery output, the lower a battery voltage. Since the power-generating output also decreases when the battery voltage decreases, the power-generating output decreases as the battery output increases. As described above, there is a trade-off relationship between the battery output and the power-generating output.

In the above technique, high-power charging is performed when the required power consumption of the traveling motor is equal to or higher than the set value, that is, when the battery output becomes high. However, as described above, since there is a trade-off relationship between the battery output and the power-generating output, there is a possibility that the request for high-power charging may not be answered when a high output is required for the battery. In this case, there is a possibility that a remaining capacity of the battery (hereinafter, also referred to as "SOC"; State of Charge) suddenly decreases, and the running performance of the vehicle may decrease.

The present disclosure has been made in view of the above-mentioned problems, and an object thereof is to provide a control system for a hybrid vehicle capable of suppressing a sudden decrease in the remaining capacity of the battery and maintaining the traveling performance of the vehicle.

A first disclosure is applied to a control system for a hybrid vehicle in order to achieve the above object. The hybrid vehicle includes a battery, a generator for generating power using the power of an internal combustion engine, and the driving motor for driving the vehicle using the output of the battery. The control system includes the hybrid vehicle and a controller for controlling the generator and the driving motor. The controller is configured to calculate a battery output request value of a battery output supplied from the battery to the driving motor and a power-generating output request value of the generator based on traveling conditions of the hybrid vehicle, and control the driving motor and the power generator based on the battery output request value and the power-generating output request value. Further, the controller is configured to execute adjustment process for adjusting the battery output request value and the power-generating output request value when a state of the battery is a state in which the power-generating output request value is not satisfied. In the adjustment process, the smaller the remaining capacity of the battery, the smaller the battery output request value is and the larger the power-generating output request value is.

A second disclosure has the following further features in the first disclosure.

In the adjustment process, the larger the power-generating output request value is, the smaller the battery output request value is and the larger the power-generating output request value is.

A third disclosure further has the following features in the first or second disclosure.

The adjustment process is configured to calculate a possible power-generating output of the generator based on the state of the battery, and to determine that the power-generating output request value is not satisfied when the power-generating output request value is larger than the power-generating output request value.

A fourth disclosure has the following features in any one of the first to third disclosures.

The adjustment process is configured to determine whether or not the power-generating output request value is not satisfied based on a voltage value of the battery.

A fifth disclosure further includes the following features in any one of the first to fourth disclosures.

The adjustment process is configured to determine whether or not the power-generating output request value is not satisfied based on a remaining capacity of the battery.

A sixth disclosure further includes the following features in any one of the first to fifth disclosures.

The adjustment process is configured to determine whether or not the power-generating output request value is not satisfied based on the battery output request value.

A seventh disclosure further includes the following features in any one of the first to sixth disclosures.

The adjustment process is configured to adjust so as to increase the power-generating output request value while decreasing the battery output request value as a remaining fuel amount of the internal combustion engine is larger.

According to the first disclosure, when the power-generating output request value is satisfied, the battery output request value and the power-generating output request value are adjusted in accordance with the remaining battery capacity. As a result, it is possible to give priority to the battery output request value when the remaining battery capacity is small, so that it is possible to suppress a sudden decrease in the remaining battery capacity and maintain the running performance of the vehicle.

According to the second disclosure, the battery output request value may be prioritized as the larger power-generating output is required. This makes it possible to suppress a sudden decrease in the remaining capacity of the battery and to maintain the running performance of the vehicle.

According to the third disclosure, since the power-generating output request value is compared with the possible power-generating output, it is possible to accurately determine whether or not the power-generating output request value is not satisfied.

The battery has a characteristic that the power-generating output decreases as the battery voltage decreases. Therefore, according to the fourth disclosure, it is possible to accurately determine whether or not the power-generating output request value is not satisfied based on the battery voltage.

The battery voltage decreases as the remaining battery capacity decreases. Therefore, according to the fifth disclosure, it is possible to determine whether or not the power-generating output request value is not satisfied based on the remaining battery capacity.

The battery voltage decreases as the battery output increases. Therefore, according to the sixth disclosure, it is possible to determine whether or not the power-generating output request value is not satisfied based on the battery output request value.

According to the seventh disclosure, in the adjustment process, as the remaining fuel amount of the internal combustion engine is larger, the battery output request value is decreased and the power-generating output request value is increased. As a result, the larger the remaining amount of fuel, the higher the priority may be given to the realization of the power-generating output request value, and therefore, it becomes possible to effectively extend the cruising distance of the vehicle.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly described otherwise, or unless the present disclosure is explicitly specified by the structures, steps or the like theoretically.

Figure 1:
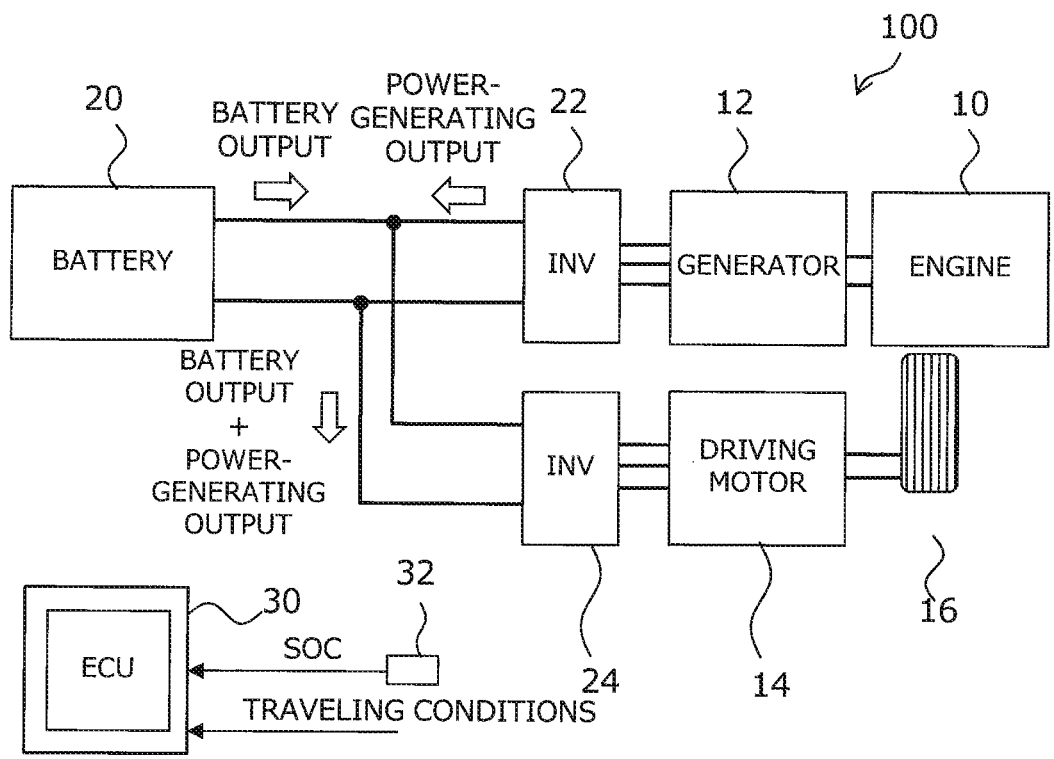
FIG. 1 is a diagram showing a schematic configuration of a control system of a hybrid vehicle according to first embodiment.

First Embodiment 1-1. Configuration of Power Supply Circuit Protection Device of First Embodiment First embodiment of the present disclosure will be described below with reference to the drawings. FIG. 1 is a diagram showing a schematic configuration of a control system for a hybrid vehicle according to the first embodiment. A control system 100 for a hybrid vehicle is a control system mounted on a series hybrid vehicle. In the following description, a hybrid vehicle installed on the control system 100 will be referred to as "vehicle M1".

The vehicle M1 installed on the control system 100 includes an engine 10, a generator 12, a driving motor 14, wheels 16, a battery 20, a generator-inverter 22, a motor-inverter 24, and an ECU (Electronic Control Unit) 30.

The engine 10 is an internal combustion engine that outputs power by combustion of hydrocarbon-based fuel such as gasoline or light oil, and includes an intake device, an exhaust device, a fuel injection device, an ignition device, a cooling device, and the like. The generator 12 is an AC synchronous generator motor having both a function as an electric motor for outputting torque by supplied electric power and a function as an electric generator for converting input mechanical power into electric power. In the control system 100, the generator 12 is mainly used as the electric generator.

The driving motor 14 is an AC synchronous generator motor having both a function as an electric motor for outputting torque by supplied electric power and a function as a generator for converting input mechanical power into electric power. The driving motor 14 is connected to the wheels 16 via a power transmission mechanism (not shown). In the control system 100, the driving motor 14 is mainly used as the electric motor for rotationally driving the wheels 16.

The battery 20 is composed of a direct-current bundle of batteries connecting multiple unit batteries. The battery 20 is composed of, for example, a lithium ion battery or a nickel metal hydride battery.

The generator-inverter 22 for generator converts AC power generated by the generator 12 into DC power and supplies the DC power to the battery 20 or the motor-inverter 24. The inverter 24 for motor converts DC power supplied from the battery 20 or the generator-inverter 22 into AC power and supplies the AC power to the driving motor 14.

The ECU 30 is a controller including a RAM (Random Access Memory), a ROM (Read Only Memory), a CPU (Central Processing Unit), and input/output interfaces. The ECU 30 receives a detection signal of the SOC sensor 32 for detecting the remaining capacity (SOC) of the battery 20, and signals related to traveling conditions such as an operation amount of an accelerator pedal of the vehicle M1 and a vehicle speed. The ECU 30 controls operations of the generator 12 and the driving motor 14 based on the inputted signals.

1-2. Operation of the Control System of First Embodiment

Next, the operation of the control system 100 according to the first embodiment will be described. In the series hybrid vehicle M1, the engine 10 is used to drive the generator 12 and is not used as a direct drive source for the wheels 16. In the control system 100 according to the first embodiment, the generator 12 is driven by the engine 10, and a power-generating operation is performed to charge the battery 20 with the power generated by the generator 12. Specifically, the ECU 30 calculates a power-generating output request value, which is a request value of the power-generating output of the generator 12, based on the SOC of the battery 20 inputted from the SOC sensor 32 and the traveling conditions of the vehicle M1. The traveling conditions include an operation amount of an accelerator pedal of the vehicle M1, the vehicle speed, and the like. The ECU 30 controls the operations of the engines 10 and the generators 12 so that the power output of the generators 12 approaches the power output request value. The power output generated by the generator 12 is converted from AC power to DC power by the generator-inverter 22, and then the battery 20 is charged.

In the control system 100, the driving motor 14 is driven using the battery output of the battery 20 to perform a traveling operation of traveling the vehicle M1. Specifically, the ECU 30 calculates a vehicle output request value, which is a request value for an output of the driving motor 14, based on the inputted travel conditions of the vehicle M1. The ECU 30 controls the battery output supplied from the battery 20 so that the output of the driving motor 14 approaches the vehicle output request value. The battery output supplied from the battery 20 is converted from DC power to AC power in the motor-inverter 24, and then the driving motor 14 is charged.

Depending on the traveling conditions of the vehicle M1, a relatively high output is required for the driving motor 14, and even if the battery output is increased, the vehicle output request value may not be satisfied. In such a case, in the control system 100 according to the first embodiment, the vehicle output request value is realized by summing a part or all of the power-generating output with the battery output. According to such a traveling operation, it is possible to realize a high vehicle output which may not be compensated by the battery output alone.

Figure 2:
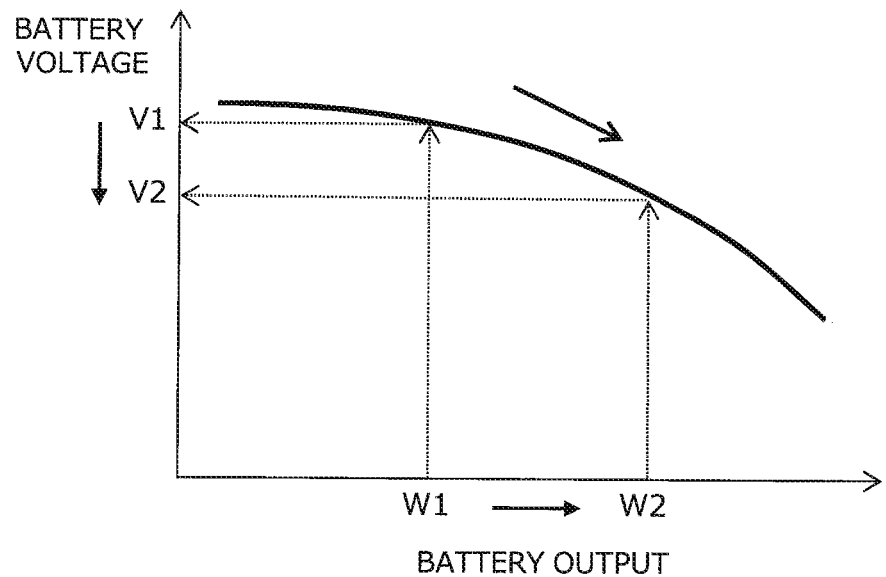
FIG. 2 is a diagram showing a relationship of a battery voltage to a battery output.
Figure 3:
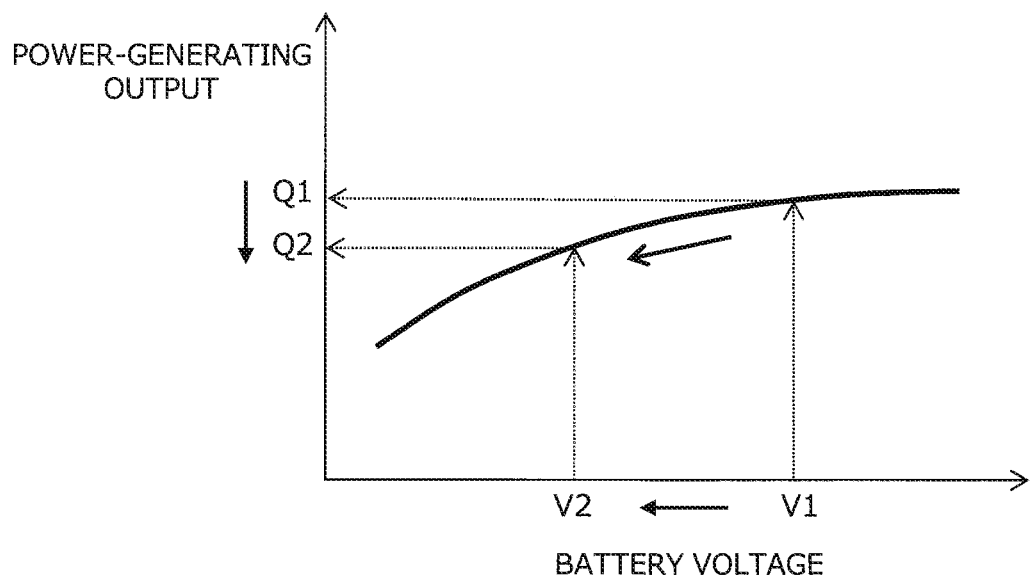
FIG. 3 is a diagram showing a relationship of a power-generating output to the battery voltage.
Figure 4:
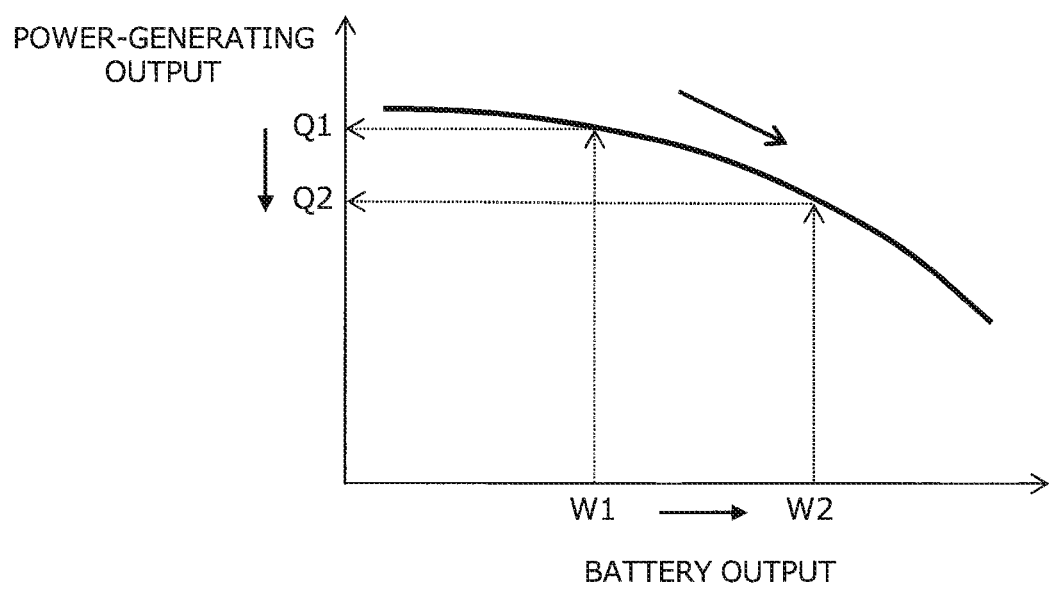
FIG. 4 is a diagram showing a relationship of the power-generating output to the battery output.

Here, in order to realize a high vehicle output request like the above-mentioned traveling operation, it is required to increase the battery output. However, increasing the battery output affects the power-generating output. FIG. 2 is a diagram showing a relationship of a battery voltage to the battery output. FIG. 3 is a diagram showing a relationship of the power-generating output to the battery voltage. FIG. 4 is a diagram showing a relationship of the power-generating output to the battery output. As shown in FIG. 2, for example, the battery 20 has a characteristic that when the battery output is increased from W1 to W2 (>W1), the battery voltage decreases from V1 to V2 (<V1). As shown in FIG. 3, for example, the battery 20 has a characteristic that when the battery voltage is decreased from V1 to V2 (<V1), the power-generating output decreases from Q1 to Q2 (<Q1). Therefore, as shown in FIG. 4, for example, the battery 20 has a characteristic that when the battery output is increased from W1 to W2 (>W1), the power-generating output decreases from Q1 to Q2 (<Q1).

In this manner, if the battery output is increased to satisfy the vehicle output request value, there is a possibility that the power-generating output request value may not be satisfied due to the decrease in the power-generating output. Further, when a high vehicle output request is issued, the power-generating output request is also increased to supplement the vehicle output request, so that it is assumed that the realization of the power-generating request becomes more difficult.

In a state in which the SOC of the battery 20 is relatively small, the vehicle traveling performance is more remarkably deteriorated due to the inability to realize the power-generating output request. Therefore, in a state where the SOC of the battery 20 is relatively small, it is preferable that the realization of the power-generating output request value is given priority over the realization of the vehicle output request value. On the other hand, when the SOC of the battery 20 is large enough to allow a decrease in the power-generating output, it is preferable to increase the battery output to realize the vehicle output request value.

Figure 5:
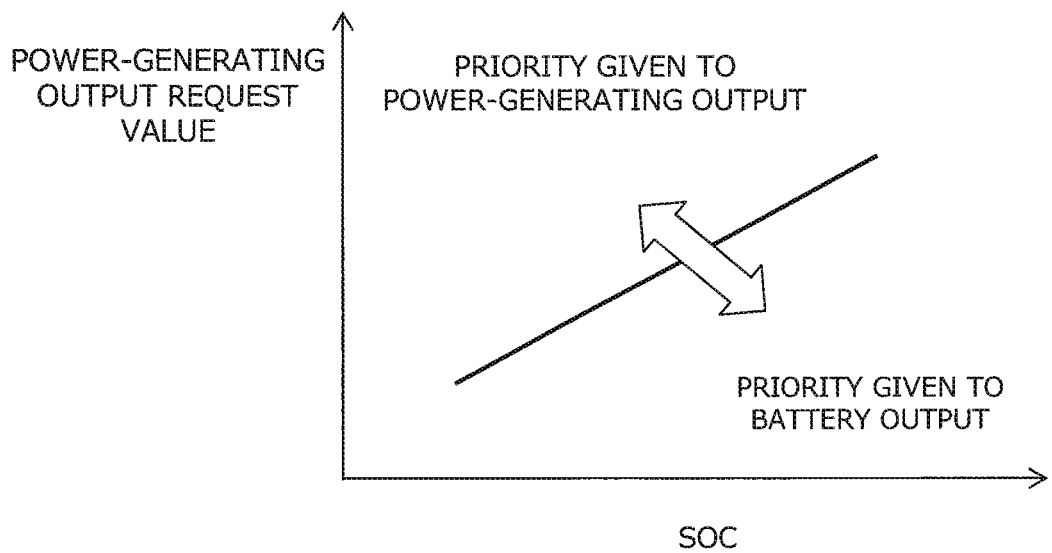
FIG. 5 is a diagram showing an image of priority adjustment of a vehicle output request value and a power-generating output request value.

In the control system 100 according to the present embodiment, when the power-generating output request may not be realized, the priority between the battery output request value and the power-generating output request value is adjusted according to the state of the SOC of the battery 20. FIG. 5 is a diagram showing an image of priority adjustment of the battery output request value and the power-generating output request value. As shown in this figure, the control system 100 monitors the SOC of the battery 20, and the lower the SOC, the higher the priority is given to the realization of the power-generating output request value. The control system 100 also monitors the power-generating output request value, and prioritizes the realization of the power-generating output request value as the power-generating output request value becomes higher.

Figure 6:
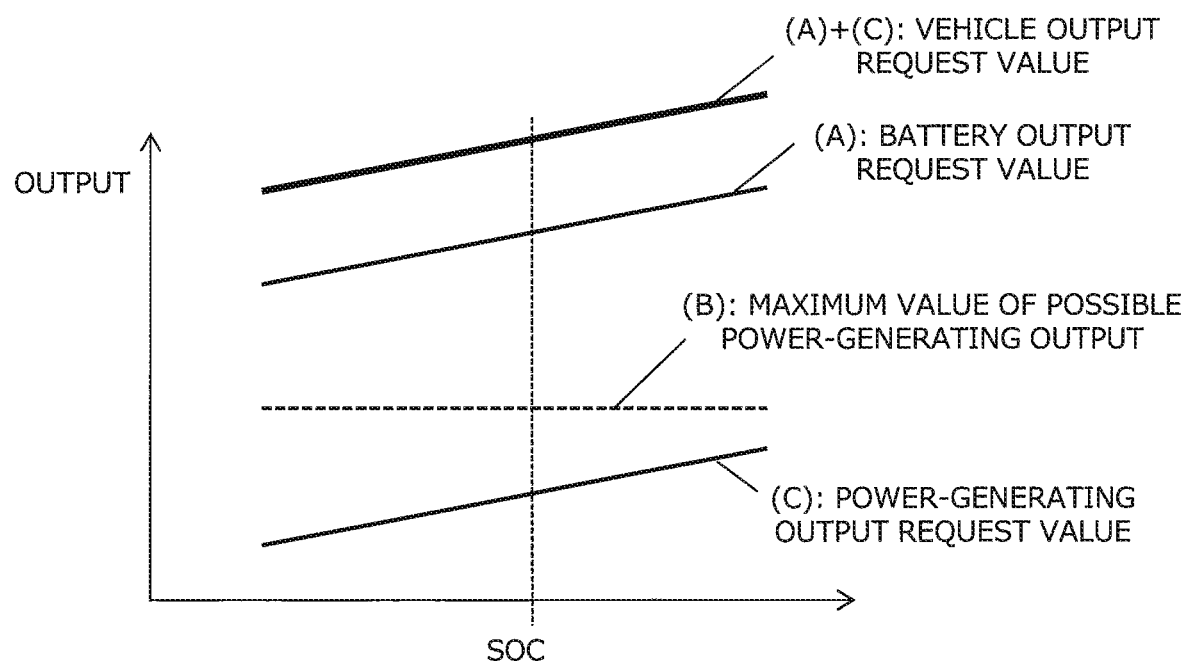
FIG. 6 is a diagram showing an image of changes in various output values with respect to a SOC of the battery when the required power-generating output s realized.
Figure 7:
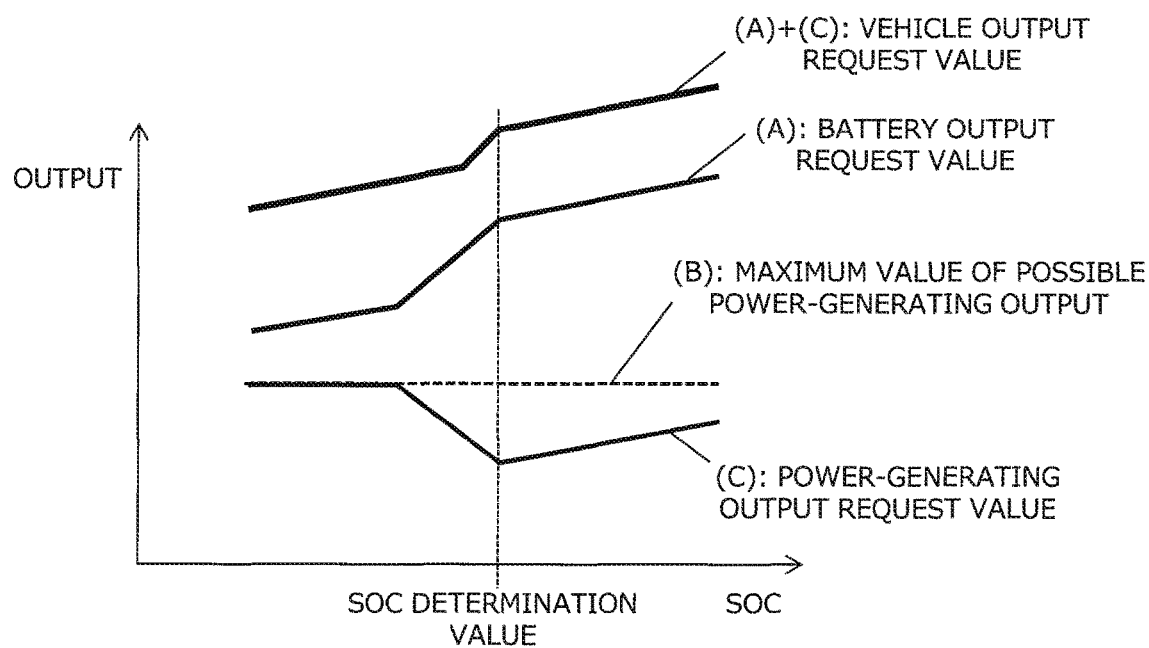
FIG. 7 is a diagram showing an image of changes in various output values with respect to the SOC of the battery when the required power-generating output is not realized.

FIG. 6 is a diagram showing an image of changes in various output values with respect to the SOC of the battery when the power-generating output request is realized. FIG. 7 is a diagram showing an image of changes in various output values with respect to the SOC of the battery when the power-generating output request may not be realized. In the examples shown in these figures, (A) shows a change in the battery output request value, (B) shows a maximum value of a possible power-generating output of the battery 20, (C) shows a change in the power-generating output request value, and (A)+(C) shows a change in the vehicle output request value.

As in the example shown in FIG. 6, when the power-generating output request is realized, it is not necessary to adjust the priority of the vehicle output request value and the power-generating output request value. On the other hand, FIG. 7 illustrates a case where the power-generating output request is not realized when the SOC of the battery 20 is smaller than the predetermined SOC determination value. In the example shown in FIG. 7, in such a case, the battery output request value is decreased and the power-generating output request value is increased to the maximum value. The SOC determination value here may be set to, for example, a lower limit value of the SOC at which the driving performance of the vehicle M1 may be maintained. According to such control, it is possible to increase the SOC by giving priority to the power-generating output at the time of low SOC in which the power-generating output request may not be realized, and to give priority to the battery output at the time of high SOC in which the power-generating output request may be realized.

1-3. Description of ECU Functions

Figure 8:
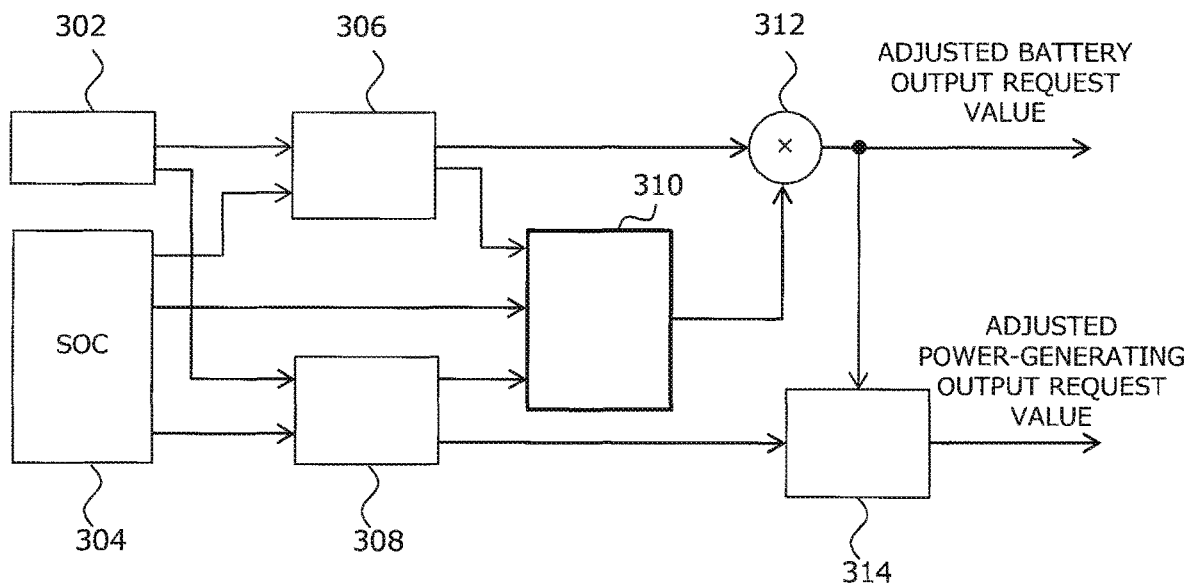
FIG. 8 is a control block diagram showing functions of an ECU.

Functions of the ECU included in the control system according to the first embodiment will be described below. FIG. 8 is a control block showing functions of the ECU. As shown in FIG. 8, the ECU 30 includes functional blocks for calculating the battery output request value and the power-generating output request value. A traveling condition receiving unit 302 receives the traveling conditions of the vehicle M1. Here, the traveling conditions corresponds to a vehicle output request of the vehicle M1 obtained from an operation amount of the accelerator pedal, a vehicle speed, and the like. The received driving conditions are sent to a battery output request value calculation unit 306. A SOC receiving unit 304 receives the SOC of the battery 20 obtained from the detection signal of the SOC sensor 32, The received SOC is sent to the battery output request value calculation unit 306, a power-generating output request value calculation unit 308, and an adjustment unit 310.

The battery output request value calculation unit 306 calculates a battery output request value that can be output from the battery 20 based on the received traveling condition and SOC. The calculated battery output request value is sent to the adjustment unit 310 and a calculation unit 312.

The power-generating output request value calculation unit 308 calculates the power-generating output request value of the battery 20 based on the received traveling conditions, SOC, and the battery output request value. The calculated power-generating output request value is sent to the adjustment unit 310 and a calculation unit 314.

The adjustment unit 310 performs adjustment process for adjusting a priority ratio between the battery output request value and the power-generating output request value according to the state of the battery 20. More specifically, the adjustment unit 310 calculates an adjustment coefficient for multiplying the battery output request value by using the priority relationship shown in FIG. 5. The calculated adjustment coefficient is sent to a calculation unit 312. The adjustment unit 310 also determines whether or not the power-generating output request value is not satisfied based on the state of the battery 20.

The calculation unit 312 outputs a value obtained by multiplying the inputted battery output request value by the adjustment coefficient as an adjusted battery output request value. The adjusted battery output request value is also sent to the calculation unit 314. The calculation unit 314 previously stores a map defining the relationship between the battery output request value and the power-generating output request value. In this map, similarly to the relationship shown in FIG. 4 described above, a relationship is shown in which the power-generating output request value may be increased as the battery output request value decreases. The calculation unit 314 outputs the power-generating output request value corresponding to the adjusted battery output request value as an adjusted power-generating output request value in accordance with the relationship shown this map.

1-4. Specific Process Executed in the Control System of the First Embodiment Next, specific process of a routine executed by the ECU 30 will be described with reference to flowchart.

Figure 9:
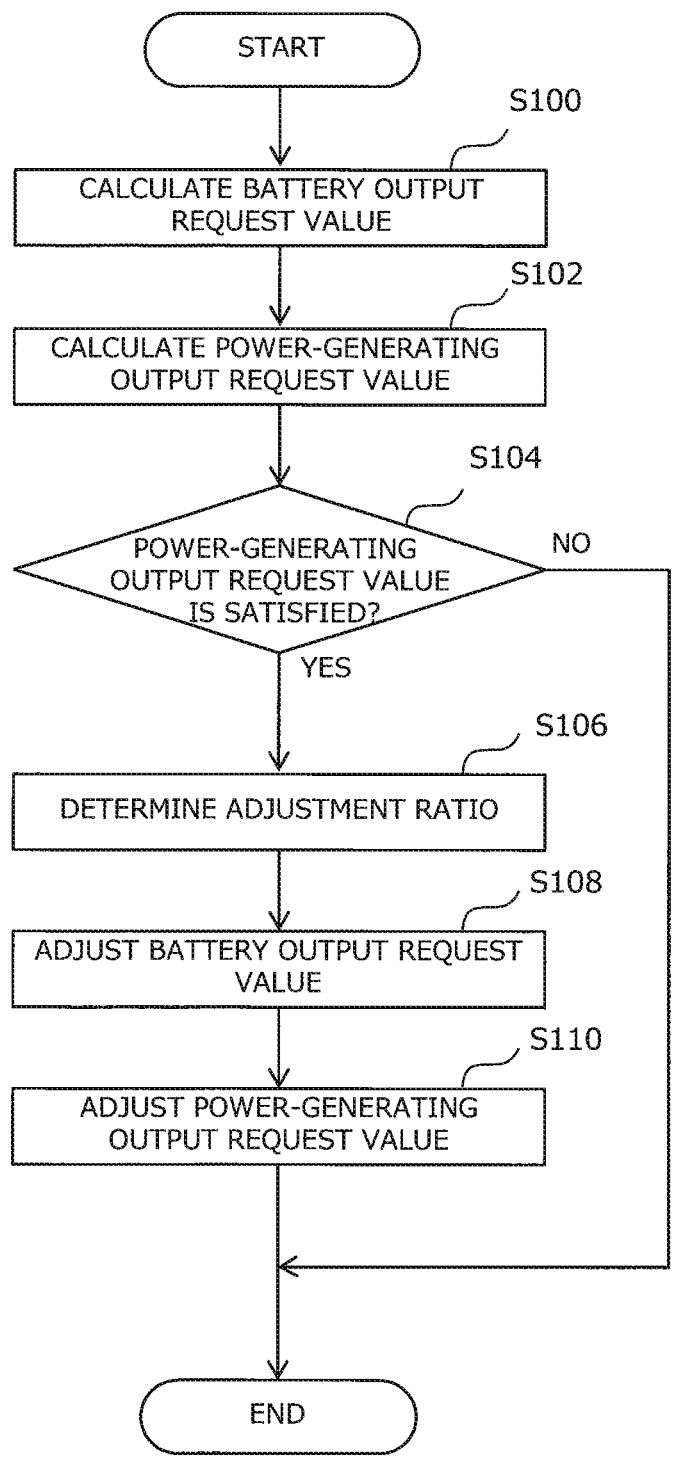
FIG. 9 is a flowchart of a routine executed in the control system according to the first embodiment.

FIG. 9 is a flowchart of a routine executed in the control system according to the first embodiment. The routine shown in FIG. 9 is repeatedly executed by the ECU 30 in a predetermined control cycle. In step S100 of the routine shown in FIG. 9, the ECU 30 calculates the battery output request value in the above-described battery output request value calculating unit 306. Next, in step S102, the ECU 30 calculates the power-generating output request value in the power-generating output request value calculation unit 308 described above.

Next, in step S104, the adjusting unit 310 of the ECU 30 determines whether or not the power-generating request value is not satisfied in accordance with the inputted state of the battery 20. Here, the ECU 30 calculates the possible power-generating output in the present state of the battery 20 based on the battery output request values and the SOC inputted to the adjusting unit 310. Then, the ECU 30 determines whether or not the inputted power-generating output request value is larger than the possible power generating output. As a result, when the determination is not satisfied (NO in step S104), it is determined that the power-generating output request value may be realized. In this case, since it is not necessary to adjust the power-generating output request value, the present routine is terminated.

On the other hand, when the determination is confirmed (YES in step S104), it is determined that the power-generating request value may not be realized. In this case, it is determined that it is necessary to adjust the power-generating output request value, and the process proceeds to the next step. In the next step S105, the adjustment unit 310 of the ECU 30 determines the adjustment ratio. The ECU 30 previously stores a map in which the adjustment ratio is associated with the priority shown in FIG. 5. The adjustment ratio here is a coefficient for reducing the battery output request value, and is configured by a coefficient of 1 or less. The adjustment ratio is set to a smaller value as the priority of the power-generating output request value is higher, that is, as the priority of the battery output request value is lower.

In the next step S108, the ECU 30 adjusts the battery output request value. Here, the ECU 30 calculates the adjusted battery output request value by multiplying the battery output request value calculated in the step S100 by the adjustment ratio determined in the step S106 in the calculating unit 312.

In the next step S110, the ECU 30 adjusts the power-generating output request value. The ECU 30 previously stores a map defining the relation between the battery output request value and the power-generating output request value. The ECU 30 calculates, in the calculation unit 314, the power-generating output request value corresponding to the adjustment battery output request value calculated in the above-described S108 as the adjusted power-generating output request value. When the process of step S110 is completed, the present routine is terminated.

As described above, according to the control system 100 of the first embodiment, the priority of the battery output request value and the power-generating output request value is adjusted according to the state of the battery 20. This makes it possible to suppress a sudden decrease in the SOC and maintain the traveling performance of the vehicle.

1-5. Modified Examples

The control system 100 according to the first embodiment may be modified as described below.

When the SOC is low or the battery output is high, the voltage of the battery 20 decreases. As shown FIG. 3, when the voltage of the battery 20 decreases, the power-generating output decreases, so that it becomes difficult to satisfy the power-generating output request value. Therefore, in the process of step S104 of the flow chart shown in FIG. 9, it may be determined whether or not the power-generating request value is not satisfied based on whether or not the voltage value of the battery 20 is smaller than a predetermined voltage determination value. As described above, the voltage of the battery 20 decreases when the SOC is low or the battery output is high. Therefore, in the process of step S104, it may be determined whether or not the SOC of the battery 20 is lower than a predetermined SOC determination value, or whether or not the battery output request value is larger than a predetermined battery output determination value.

In the process of step S106 of the flow chart shown in FIG. 9, the absolute value of the quantity to be reduced from the battery output request value may be determined, not limited to the adjustment ratio of the battery output request value. In this instance, the ECU 30 previously stores, for example, a map in which the absolute value information "if the battery output is lowered by A [kW], the power-generating output increases by B [kW]" is associated with the SOC and the power-generating output request value, and acquires the absolute value information corresponding to the SOC and the power-generating output request value in the process of step S106. Then, in the process of the following step S108, the ECU 30 subtracts the absolute value (e.g., A [kW]) of the battery output of the absolute value information from the battery output request value to obtain the adjusted battery output request value. Then, in the process of the following step S110, the ECU 30 adds the absolute value (e.g., B [kW]) of the power-generating output of the absolute value information to the power-generating output to obtain the adjusted power-generating output request value. As a result, similarly to the case where the adjustment ratio of the battery output request value is used, it is possible to adjust so that the adjusted battery output request value is decreased and the adjusted power-generating output request value is increased.

For example, in a range extender vehicle equipped with an engine as a generator for the purpose of extending the cruising range, the use of fuel tends to be prioritized in order to extend the cruising range. Therefore, from the viewpoint of extending the cruising range, it is preferable that the power-generating output is given priority as a remaining fuel amount is larger. Therefore, in the control system 100 according to the first embodiment, the adjustment ratio may be determined in consideration of the remaining fuel amount of the engine 10 in addition to the SOC and the power-generating output request value. In this instance, for example, the ECU 30 may previously store a map in which the adjustment ratio is associated so that the power-generating output is prioritized as the remaining fuel amount becomes larger, in addition to the points of view of the SOC and the power-generating output request value, and may determine the adjustment ratio corresponding to the SOC, the power-generating output request value, and the remaining fuel amount in the process of step S106 of the flow chart shown in FIG. 9. As a result, the larger the remaining fuel amount, the larger the power-generating output request value may be, and therefore, the use of the fuel may be promoted and the cruising range may be extended.

The SOC of the battery 20 is not limited to the configuration obtained using the SOC sensor 32, and may be obtained using a well-known estimation method.

The control system 100 according to the first embodiment may be applied to a range extender vehicle as well as a series hybrid vehicle.

In the process of step S106 of the flow chart shown in FIG. 9, the adjustment ratio may be determined such that the lower the SOC of the battery 20 is, the higher the power-generating output request value is.

What is claimed is:

1. A control system for a hybrid vehicle,
the hybrid vehicle including a battery, a generator for generating electric power using the power of an internal combustion engine, and a driving motor for driving the vehicle using the output of the battery,
the control system comprising: the hybrid vehicle; and a controller for controlling the generator and the driving motor,
wherein the controller is configured to calculate a battery output request value of a battery output supplied from the battery to the driving motor and a power-generating output request value of the generator based on traveling conditions of the hybrid vehicle, and control the driving motor and the power generator based on the battery output request value and the power-generating output request value,
wherein the controller is configured to execute an adjustment process for adjusting the battery output request value and the power-generating output request value when a state of the battery is a state in which the power-generating output request value is not satisfied,
wherein the adjustment process is configured to adjust such that the smaller the remaining capacity of the battery, the smaller the battery output request value is and the larger the power-generating output request value is.

2. The hybrid vehicle control system according to claim 1, wherein the adjustment process is configured to adjust such that the larger the power-generating output request value is, the smaller the battery output request value is and the larger the power-generating output request value is.

3. The hybrid vehicle control system according to claim 1, wherein the adjustment process is configured to calculate a possible power-generating output of the generator based on the state of the battery, and to determine that the power-generating output request value is not satisfied when the power-generating output request value is larger than the possible power-generating output.

4. The hybrid vehicle control system according to claim 1, wherein the adjustment process is configured to determine whether or not the power-generating output request value is not satisfied based on a voltage value of the battery.

5. The hybrid vehicle control system according to claim 1, wherein the adjustment process is configured to determine whether or not the power-generating output request value is not satisfied based on a remaining capacity of the battery.

6. The hybrid vehicle control system according to claim 1, wherein the adjustment process is configured to determine whether or not the power-generating output request value is not satisfied based on the battery output request value.

7. The hybrid vehicle control system according to claim 1, wherein the adjustment process is configured to adjust so as to increase the power-generating output request value while decreasing the battery output request value as a remaining fuel amount of the internal combustion engine is larger.

\* \* \* \* \*